United States Patent
Cheng et al.

(10) Patent No.: US 12,453,294 B2
(45) Date of Patent: Oct. 21, 2025

(54) MULTI-LEVEL PROGRAMMING OF PHASE CHANGE MEMORY DEVICE

(71) Applicant: INTERNATIONAL BUSINESS MACHINES CORPORATION, Armonk, NY (US)

(72) Inventors: Kangguo Cheng, Schenectady, NY (US); Juntao Li, Cohoes, NY (US); Ching-Tzu Chen, Ossining, NY (US); Carl Radens, LaGrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 794 days.

(21) Appl. No.: 17/547,152

(22) Filed: Dec. 9, 2021

(65) Prior Publication Data

US 2023/0189667 A1 Jun. 15, 2023

(51) Int. Cl.
*H10N 70/20* (2023.01)
*H10N 70/00* (2023.01)

(52) U.S. Cl.
CPC ......... *H10N 70/231* (2023.02); *H10N 70/011* (2023.02); *H10N 70/826* (2023.02); *H10N 70/8413* (2023.02); *H10N 70/8828* (2023.02)

(58) Field of Classification Search
CPC .. H10N 70/231; H10N 70/011; H10N 70/826; H10N 70/8413; H10N 70/8828; H10N 70/063; H10N 70/253; H10N 70/821; G11C 8/16; G11C 2213/52; G11C 11/5628; G11C 13/0004; G11C 13/003; G11C 13/0069; G11C 2013/0045; G11C 2013/008
See application file for complete search history.

(56) References Cited

U.S. PATENT DOCUMENTS

| | | | |
|---|---|---|---|
| 6,927,410 B2 * | 8/2005 | Chen | H10N 70/231 438/102 |
| 7,485,891 B2 | 2/2009 | Hamann et al. | |
| 7,928,423 B2 | 4/2011 | Shim et al. | |
| 8,634,236 B2 | 1/2014 | Park et al. | |
| 8,921,817 B2 | 12/2014 | Son | |
| 9,076,962 B2 | 7/2015 | Hong et al. | |
| 9,142,771 B2 | 9/2015 | Hidaka et al. | |

(Continued)

FOREIGN PATENT DOCUMENTS

TW 201010006 A 3/2010

OTHER PUBLICATIONS

C. Lee, Y. Song and Y. Shin, "Endurance Enhancement of Multi-Level Cell Phase Change Memory," 2019 IEEE/ACM International Conference on Computer-Aided Design (ICCAD), Westminster, CO, USA, 2019, pp. 1-8, doi: 10.1109/ICCAD45719.2019.8942175 (Year: 2019).*

(Continued)

*Primary Examiner* — Sitaramarao S Yechuri
(74) *Attorney, Agent, or Firm* — Yuanmin Cai

(57) ABSTRACT

A phase change memory includes a phase change structure. There is a heater coupled to a first surface of the phase change structure. A first electrode is coupled to a second surface of the phase change structure. A second electrode coupled to a second surface of the heater. A third electrode is connected to a first lateral end of the phase change structure and a fourth electrode connected to a second lateral end of the phase change structure.

20 Claims, 20 Drawing Sheets

AA CROSS-SECTION VIEW

(56) References Cited

U.S. PATENT DOCUMENTS

| | | | |
|---|---|---|---|
| 10,147,876 B1 | 12/2018 | Huang | |
| 10,622,063 B2 | 4/2020 | Grobis et al. | |
| 2004/0178404 A1 | 9/2004 | Ovshinsky | |
| 2006/0097775 A1 | 5/2006 | Zhu et al. | |
| 2007/0096071 A1* | 5/2007 | Kordus, II | G11C 13/0004 |
| | | | 257/E45.002 |
| 2007/0097739 A1* | 5/2007 | Happ | H10N 70/828 |
| | | | 365/163 |
| 2008/0007995 A1 | 1/2008 | Schwerin | |
| 2008/0064200 A1 | 3/2008 | Johnson et al. | |
| 2009/0166601 A1 | 7/2009 | Czubatyj et al. | |
| 2009/0278107 A1 | 11/2009 | Kim et al. | |
| 2010/0034016 A1 | 2/2010 | Liu | |
| 2013/0105757 A1* | 5/2013 | Park | H10N 70/063 |
| | | | 257/E45.001 |
| 2016/0020393 A1 | 1/2016 | Park et al. | |
| 2018/0138399 A1* | 5/2018 | Liu | H10N 70/826 |
| 2018/0144796 A1 | 5/2018 | Meade | |
| 2020/0388650 A1 | 12/2020 | Nardi et al. | |
| 2021/0281466 A1 | 9/2021 | Loghin et al. | |
| 2021/0305505 A1 | 9/2021 | Philip | |

OTHER PUBLICATIONS

Glenco McGraw-Hill "Study Guide and Intervention Workbook", p. 85, ISBN 13: 978-0-07-890848-4 ISBN 10: 0-07-890848-5 (Year: 2025).*

Google search "trapezoidal prism", <https://www.google.com/search?q=trapezoidal+prism> (Year: 2025).*

Ahmed, I. et al., "Finite Element Modeling of Synaptic Plasticity in Mushroom-type Phase Change Memory Devices for Application in Neuromorphic Systems"; 2nd International Conference on Robotics, Electrical and Signal Processing Techniques (ICREST—2021); pp. 582-586.

Papandreou, N. et al., "Multilevel Phase-Change Memory"; 17th IEEE International Conference on Electronics, Circuits and Systems (2010); pp. 1017-1020.

International Search Report and Written Opinion issued Feb. 27, 2023 in related international application No. PCT/EP2022/082075, 9 pgs.

Disclosed Anonymously, "Cell Design for MLC Capability Using Thermoelectrics"; IP.Com (2014); 6 pgs.

Bruce, R. L. et al., "Mushroom-Type Phase Change Memory with Projection Liner: An Array-Level Demonstration of Conductance Drift and Noise Mitigation"; IEEE Xplore (2021); 6 pgs.

* cited by examiner

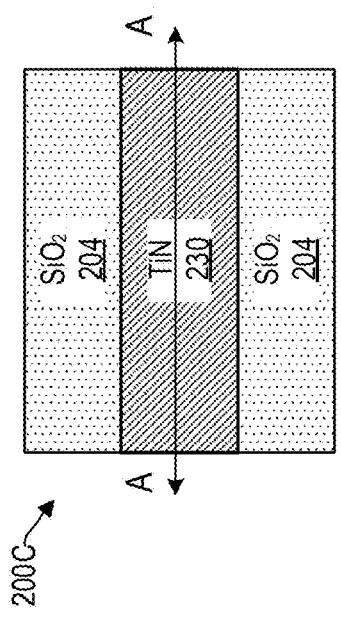
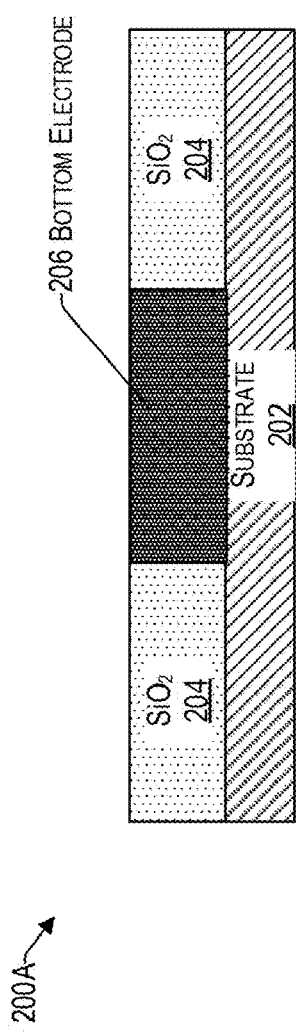
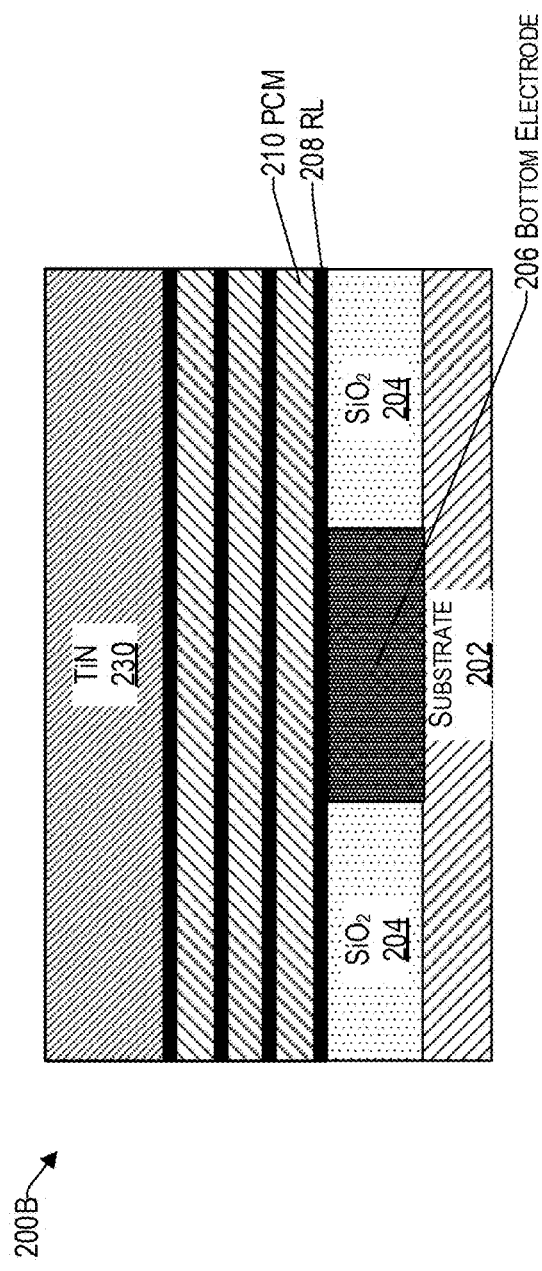

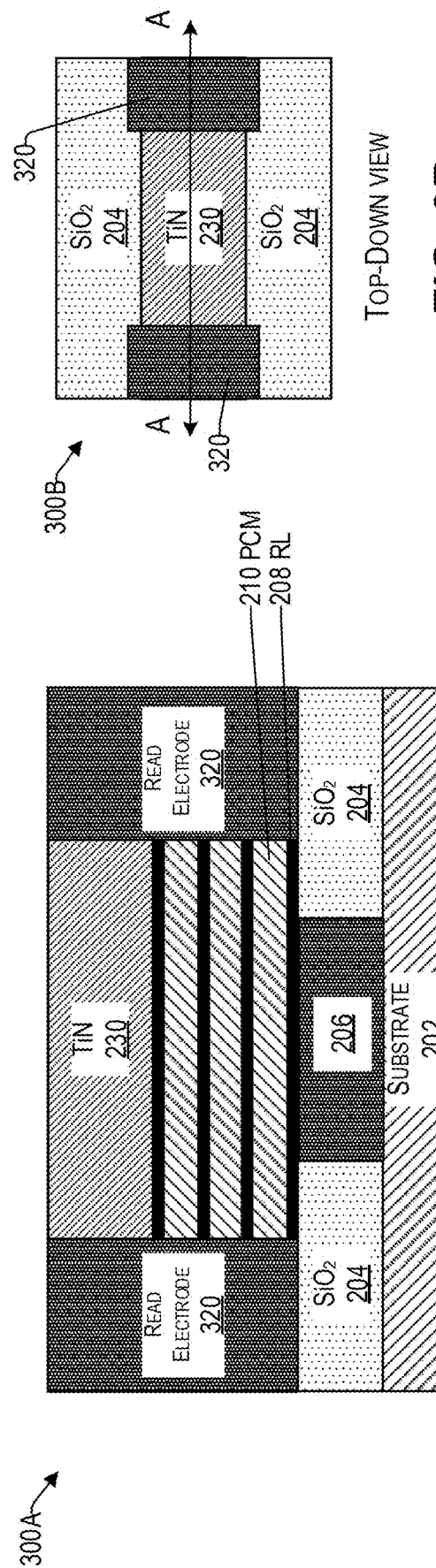

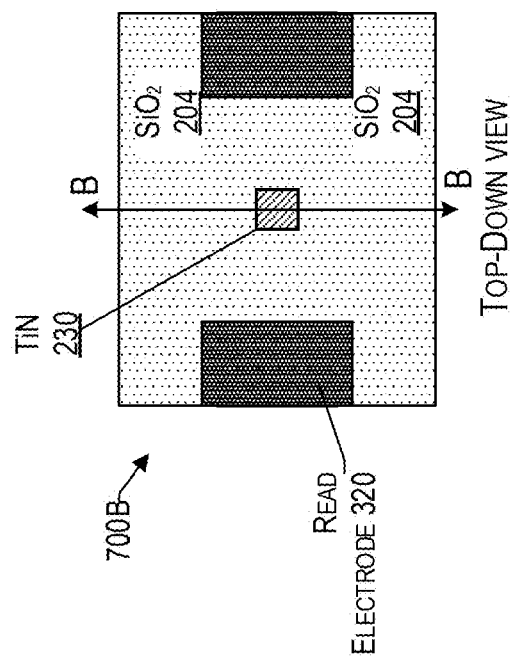
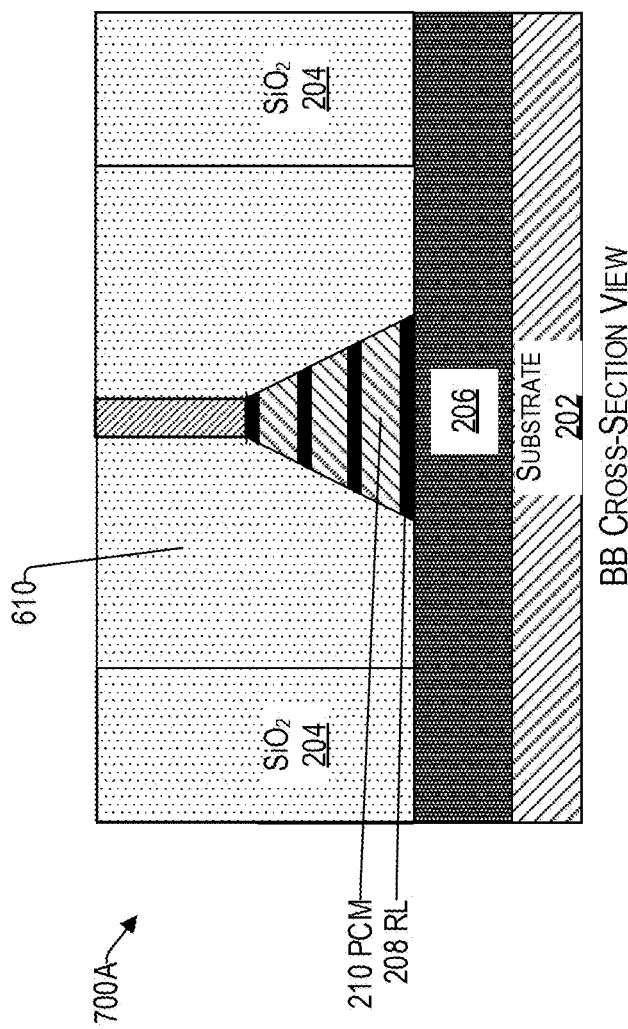
FIG. 7B
FIG. 7A

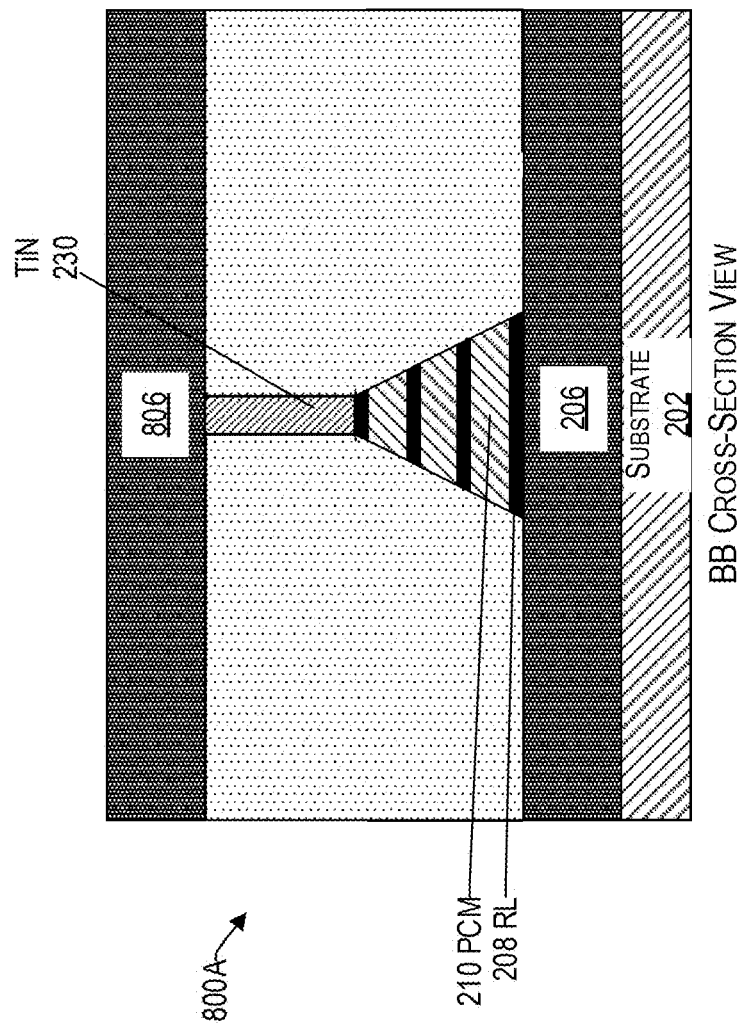
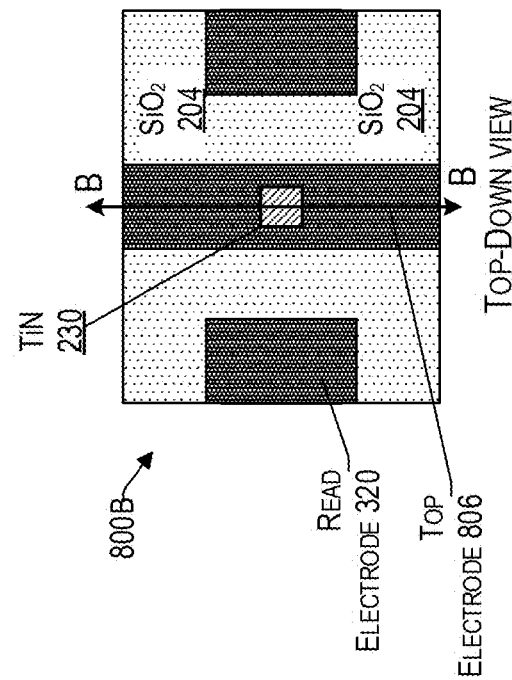
FIG. 8A
FIG. 8B

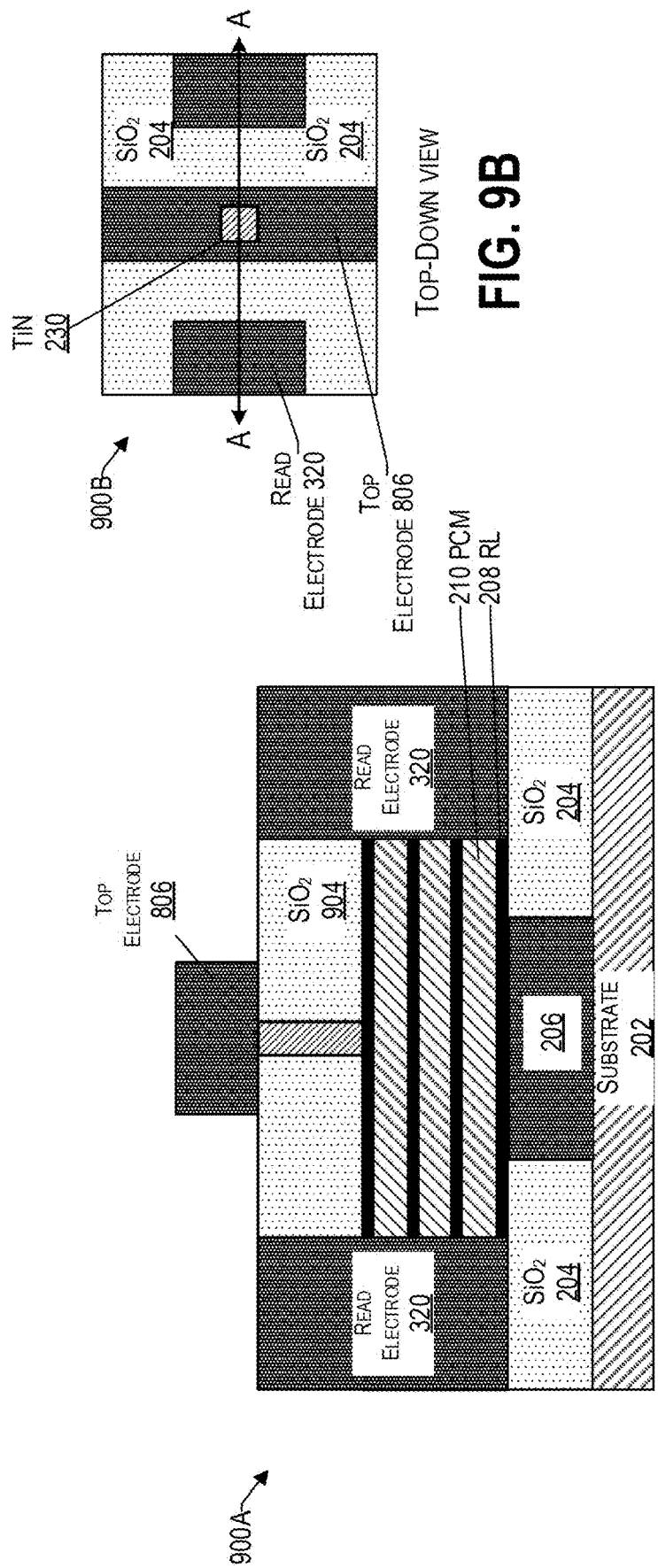

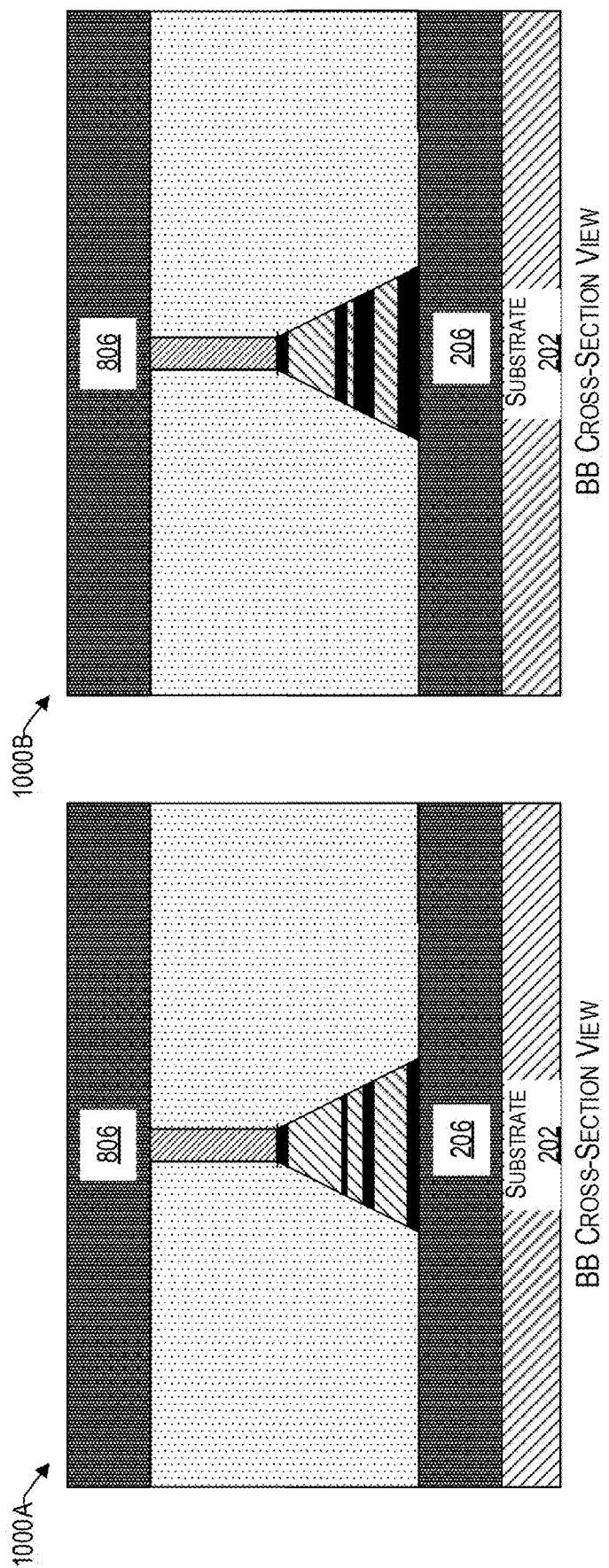

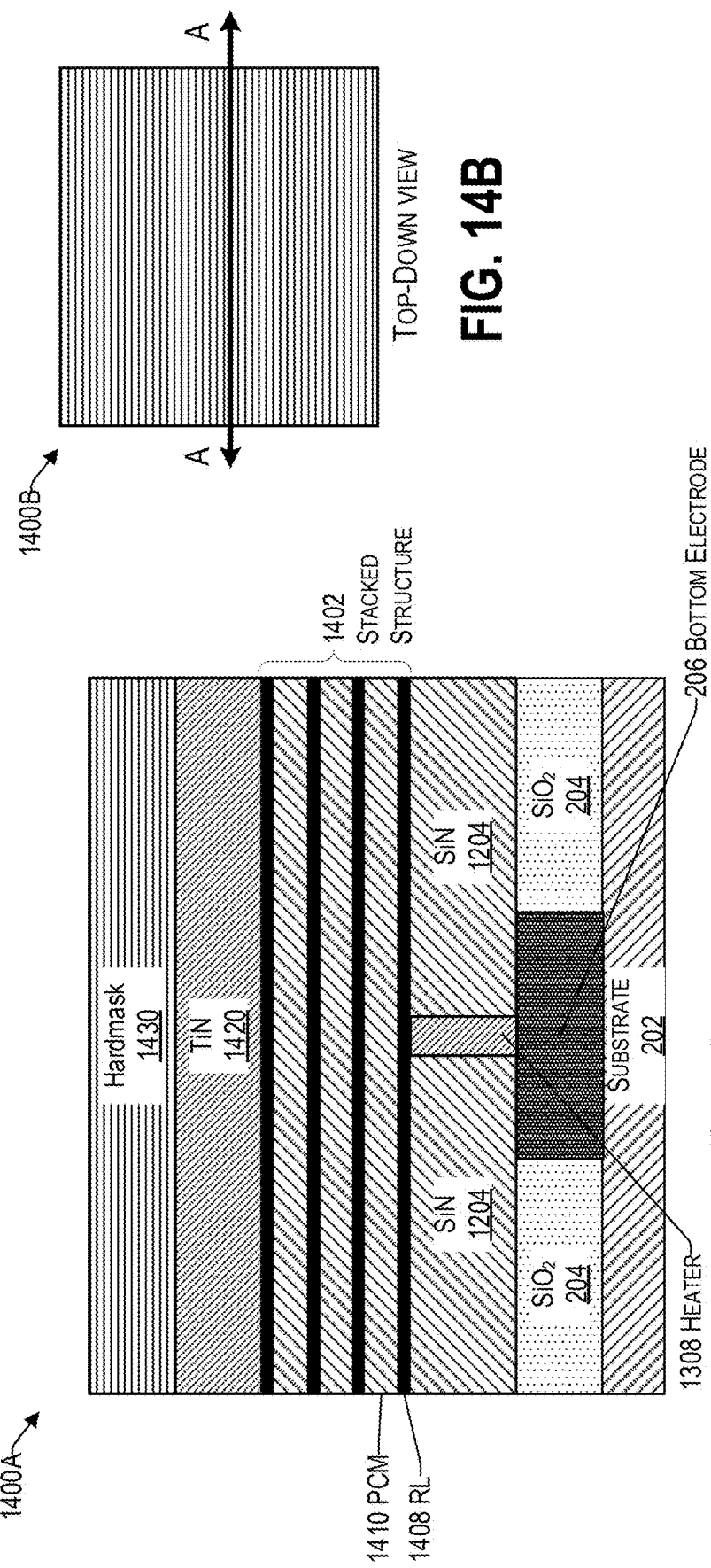

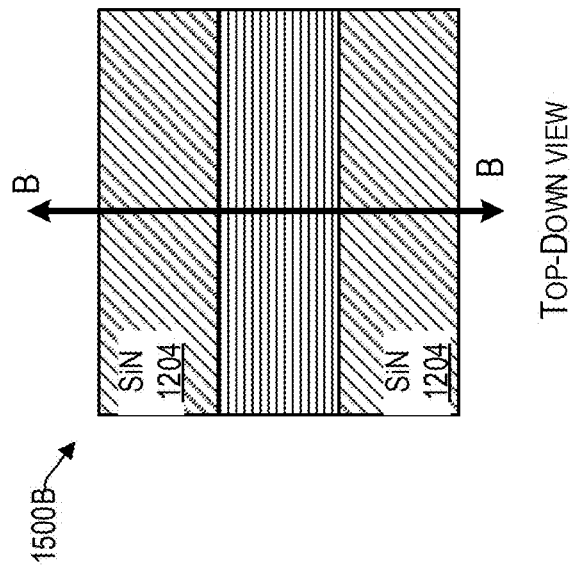
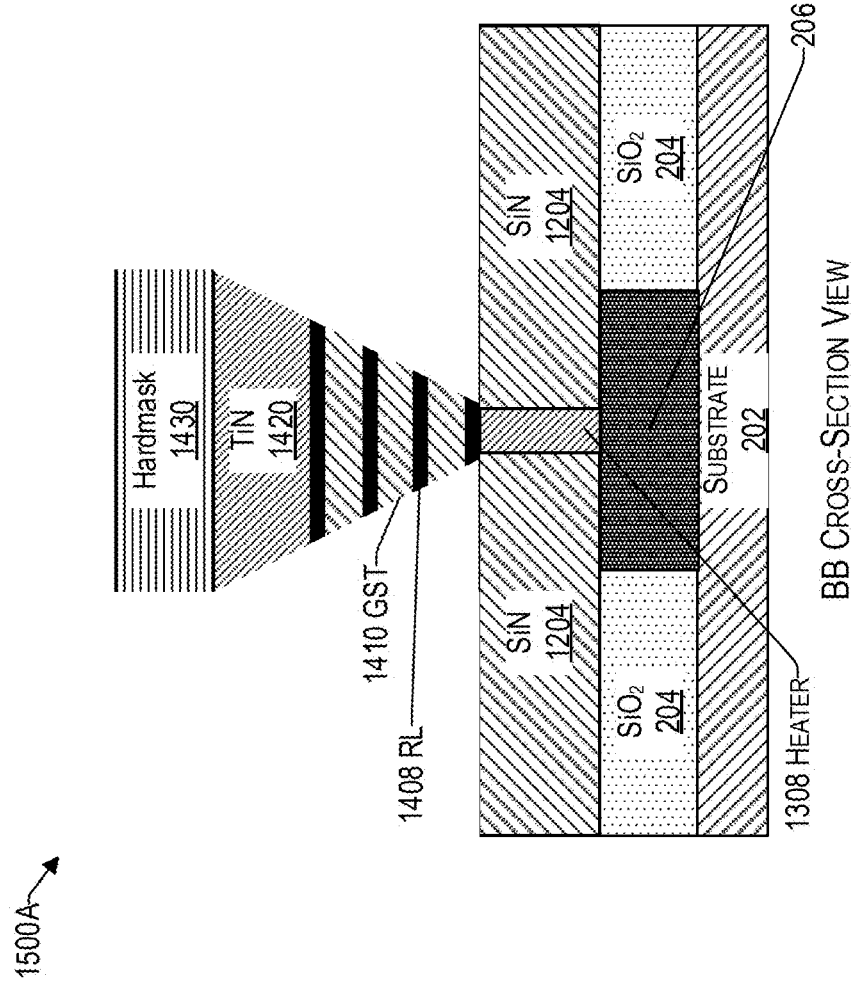

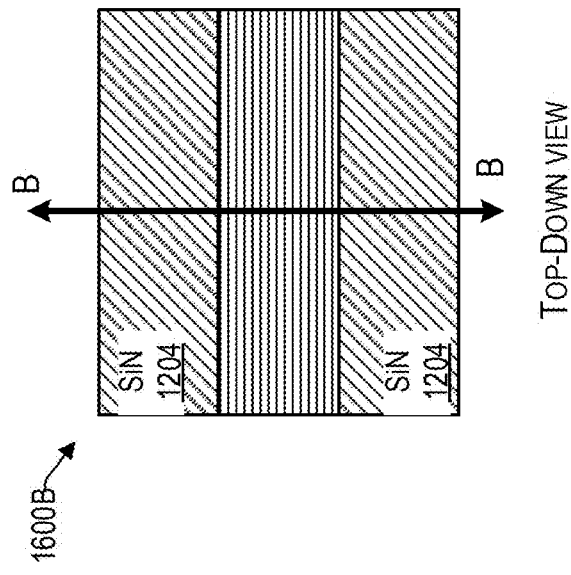
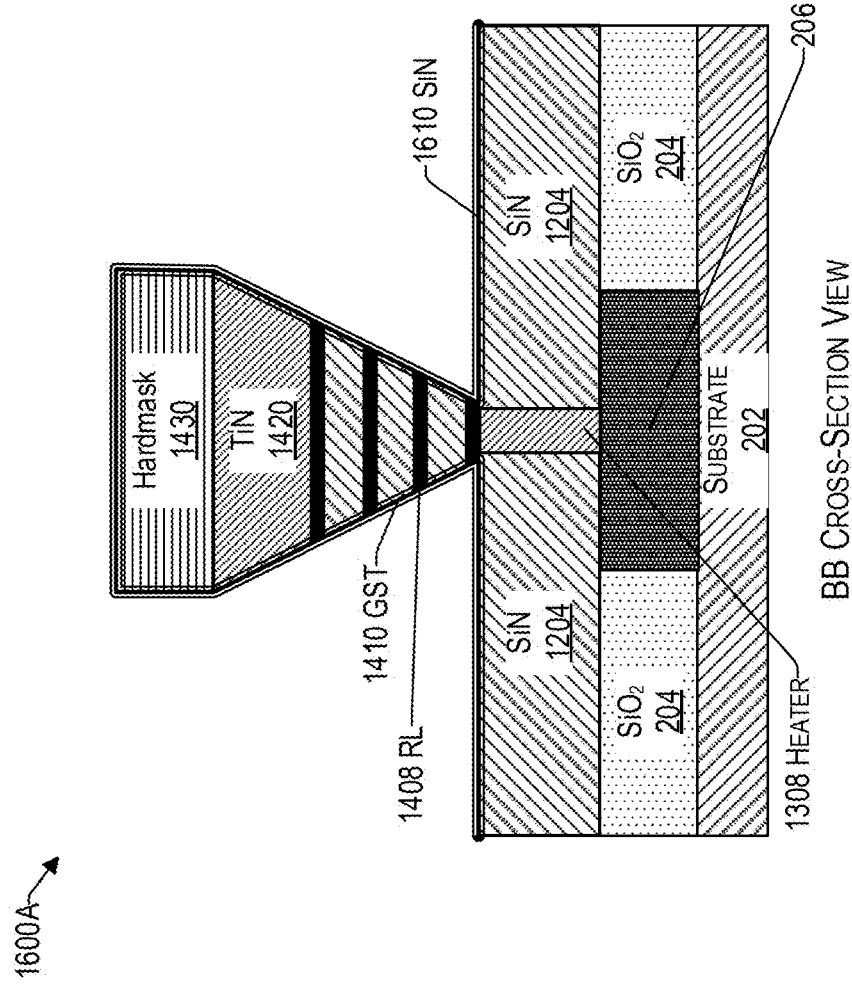

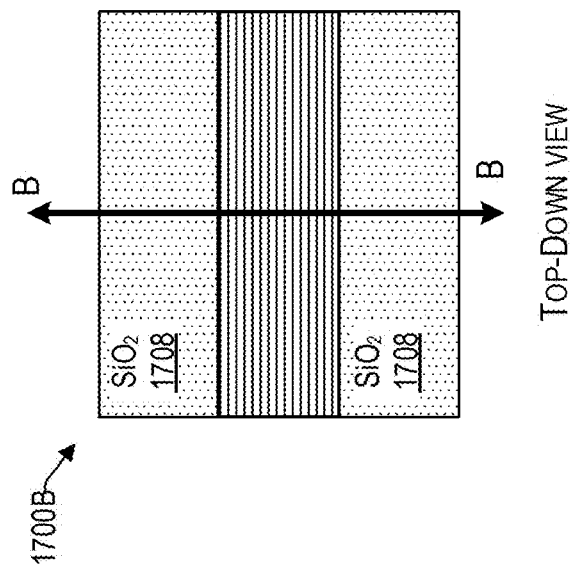
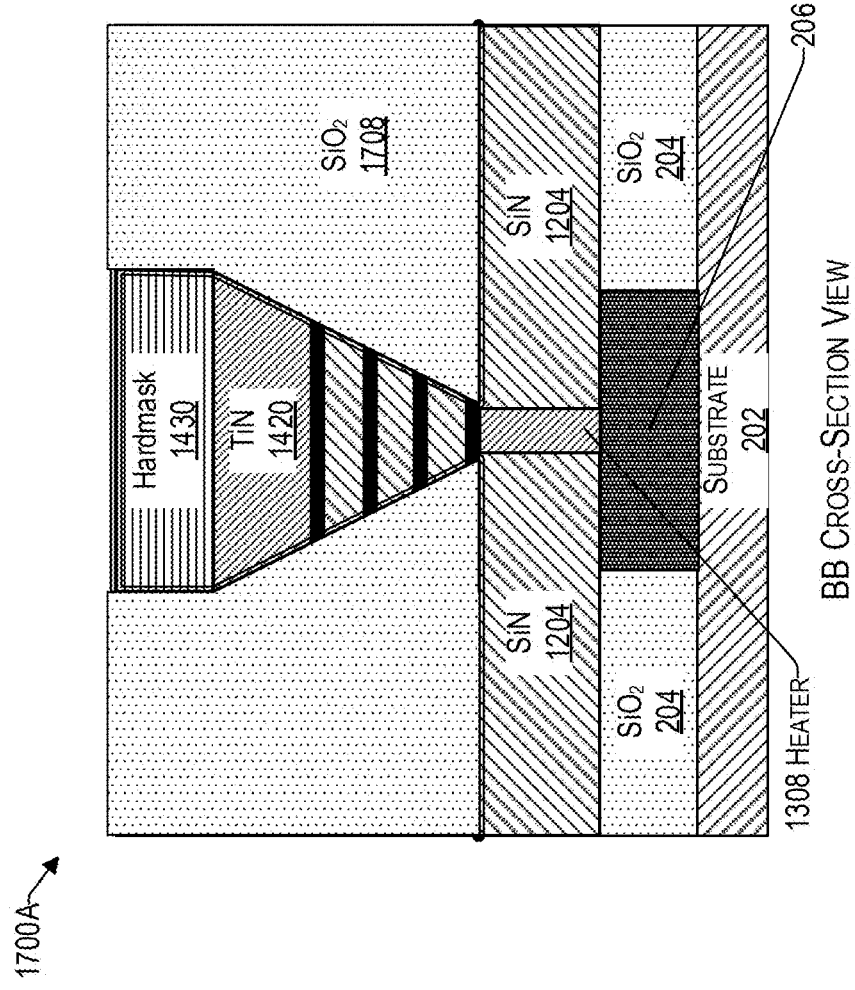

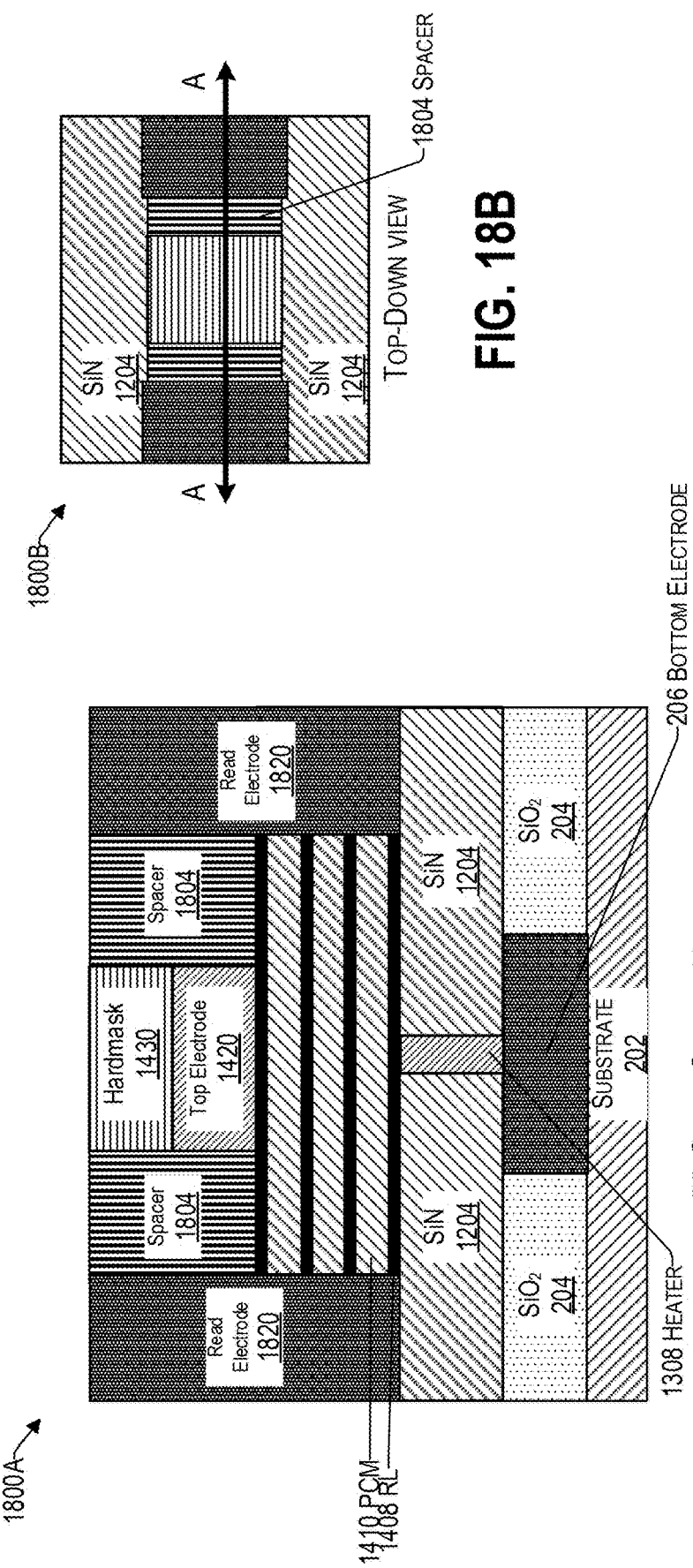

3D PERSPECTIVE VIEW

1900

MULTI-LEVEL PROGRAMMING OF PHASE CHANGE MEMORY DEVICE

BACKGROUND

Technical Field

The present disclosure generally relates to semiconductor devices, and more particularly, to phase change memory devices and methods of manufacturing the same.

Description of the Related Art

In recent years, phase change memory (PCM) has emerged as a viable memory technology and has been considered to be a potential next-generation non-volatile solid-state memory. A phase change material memory is a type of non-volatile memory device that stores information as a resistive state of a material that can be in different resistive states corresponding to different phases of the material. The different phases can include an amorphous state having high resistivity and a crystalline state having low resistivity (i.e., a lower resistivity than in the amorphous state). The transition between the amorphous state and the crystalline state can be induced by controlling the rate of cooling after application of an electrical pulse that renders the phase change memory material amorphous in a first part of a programming process. The second part of the programming process includes control of the cooling rate of the phase change memory material. If rapid quenching occurs, the phase change memory material can cool into an amorphous high resistivity state. If slow cooling occurs, the phase change memory material can cool into a crystalline low resistivity state. In this way, a state of the PCM can be controlled.

SUMMARY

In various embodiments, a phase change memory cell and a method of manufacturing the same are provided. The phase change memory cell includes a phase change structure. A heater is coupled to a first surface of the phase change structure. A first electrode coupled to a second surface of the phase change structure. A second electrode is coupled to a second surface of the heater. A third electrode is connected to a first lateral end of the phase change structure and a fourth electrode is connected to a second lateral end of the phase change structure.

In one embodiment, the phase change structure includes a stack of alternating layers of a resistive liner (RL) and a phase change memory (PCM).

In one embodiment, a thickness of at least one PCM layer in the stack of alternating layers of the RL and the PCM layers is different from other PCM layers of the stack.

In one embodiment, a thickness of at least one RL layer in the stack of alternating layers of the RL and the PCM layers is different from other RL layers of the stack.

In one embodiment, the phase change structure includes a uniform phase change material (PCM) without any RL layers.

In one embodiment, the phase change structure has a trapezoidal-prism shaped.

In one embodiment, the phase change structure has a first portion that is trapezoidal shaped and a second abutting portion that is rounded or squared off.

In one embodiment, the first and second electrodes are configured to program the phase change structure.

In one embodiment, the phase change structure is configured to store two or more bits.

In one embodiment, the third and fourth electrodes are configured to read a state of the phase change structure.

In one embodiment, there is a substrate below the first electrode. A first dielectric layer is on top of the substrate and on a left and right sides of the first electrode. A second dielectric layer is on top of the phase change structure and a left and right side of the heater.

In one embodiment, the phase change structure tapers wider towards the substrate.

In one embodiment, there is a substrate below the second electrode. A first dielectric layer is on top of the substrate and on a left and right sides of the second electrode. A silicon nitride (SiN) layer is on top of the first dielectric layer and the second electrode, as well as on a left and right sides of the heater.

In one embodiment, the phase change structure tapers narrower towards the substrate.

In one embodiment, the heater has a ring shape.

In one embodiment, the heater includes multiple layers.

According to one embodiment, a method of fabricating a phase change memory cell memory is provided. A bottom electrode is provided. A phase change structure is created above the bottom electrode. A left electrode and a right electrode are formed on a left side and a right side of the phase change structure, respectively. A heater is formed on top of the phase change structure. A top electrode is provided on top of the heater.

In one embodiment, the bottom electrode is on top of a substrate and the phase change structure has a trapezoidal-prism shape that tapers wider towards the substrate.

In one embodiment, multiple levels of the phase change structure by way of the left and right electrodes.

In one embodiment, creating the phase change structure includes providing a stack of alternating layers of a resistive liner (RL) and a phase change memory (PCM).

In one embodiment, the method further includes providing a first dielectric layer on top of a substrate and on a left and right sides of the first electrode. A second dielectric layer is created on top of the phase change structure and a left and right sides of the heater.

The techniques described herein may be implemented in a number of ways. Example implementations are provided below with reference to the following figures.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

FIG. 2A provides a semiconductor structure that has undergone some semiconductor processing steps, consistent with an illustrative embodiment.

FIGS. 2B and 2C provide a cross-section view and a top view, respectively, of a semiconductor structure having a deposition of alternately stacked phase change memory layer and a resistive liner, consistent with an illustrative embodiment.

FIGS. 3A and 3B provide a cross-section view and a top view, respectively, of a semiconductor structure having a deposition of read electrodes on the lateral left and right sides of the semiconductor structure, consistent with an illustrative embodiment.

FIGS. 7A and 7B provide a cross-section view and a top view, respectively, of a semiconductor structure immediately after the deposition and planarization of the encapsulation layer, consistent with an illustrative embodiment.

FIGS. 8A and 8B provide a cross-section view and a top view, respectively, of a semiconductor structure with a top electrode, consistent with an illustrative embodiment.

FIGS. 9A and 9B provide another cross-section view and a top view, respectively, of a semiconductor structure with a top electrode, consistent with an illustrative embodiment.

FIGS. 10A and 10B provide cross section views of memory structures having a stacked structure where the resistive liners and/or phase change memory layers may be of different thickness, consistent with illustrative embodiments.

FIGS. 14A and 14B provide a cross-section view and a top view, respectively, of a semiconductor structure having a phase change structure coupled to the heater, consistent with an illustrative embodiment.

FIGS. 15A and 15B provide a different cross-section view and a top view of a semiconductor structure that illustrates an example shape of the stack of alternating resistive liner and phase change memory layers, consistent with an illustrative embodiment.

FIGS. 16A and 16B provide a cross-section view and a top view, respectively, having an encapsulation layer, consistent with an illustrative embodiment.

FIGS. 17A and 17B provide a cross-section view and a top view of a semiconductor structure with a deposition of a dielectric, consistent with an illustrative embodiment.

FIGS. 18A and 18B show another cross-section view and a top view of a semiconductor structure, consistent with an illustrative embodiment.

DETAILED DESCRIPTION

Overview

Figure 1A:
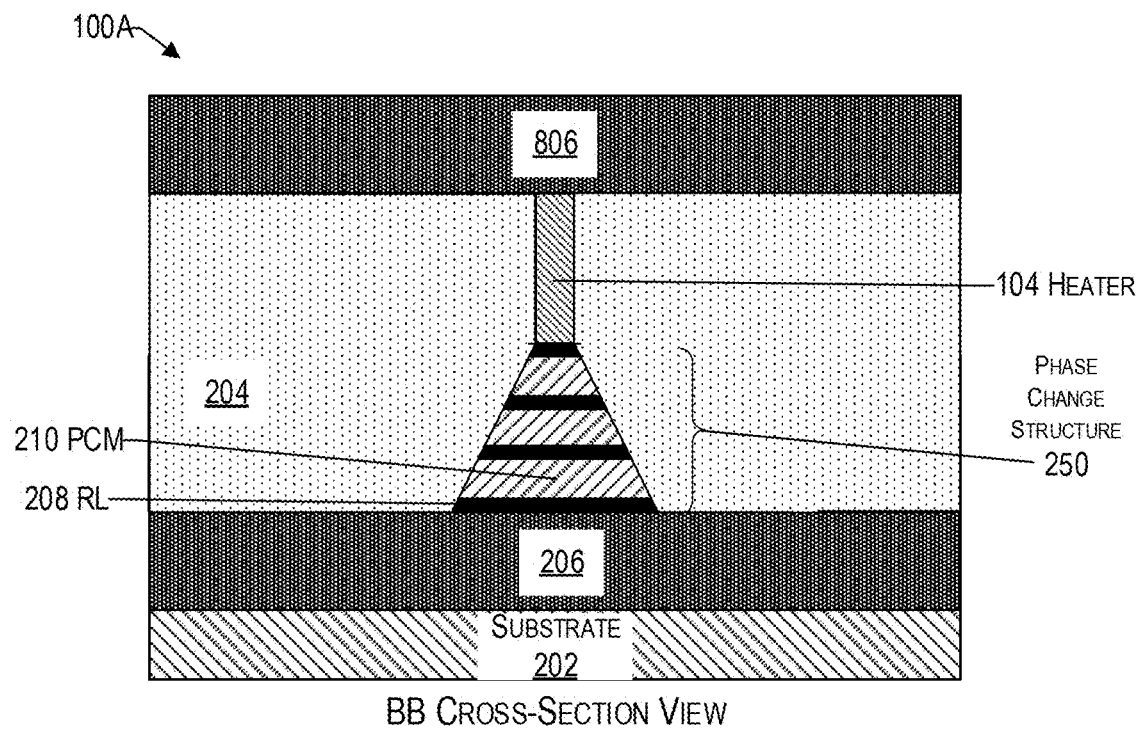
FIGS. 1A and 1B provide a front and side cross-section view of a phase change memory, respectively, which can store two or more bits, consistent with an illustrative embodiment.

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

In one aspect, spatially related terminology such as "front," "back," "top," "bottom," "beneath," "below," "lower," above," "upper," "side," "left," "right," and the like, may be used with reference to the orientation of the Figures being described. Since components of embodiments of the disclosure can be positioned in a number of different orientations, the directional terminology is used for purposes of illustration and is in no way limiting. Thus, it will be understood that the spatially relative terminology is intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation that is above, as well as, below. The device may be otherwise oriented (rotated 90 degrees or viewed or referenced at other orientations) and the spatially relative descriptors used herein should be interpreted accordingly.

As used herein, the terms "lateral" and "horizontal" describe an orientation parallel to a first surface of a semiconductor substrate or semiconductor body. For example, substrate can be the surface of a wafer or a die.

As used herein, the term "vertical" describes an orientation that is arranged perpendicular to the first surface of the semiconductor substrate or semiconductor body.

As used herein, the terms "coupled" and/or "electrically coupled" are not meant to mean that the elements must be directly coupled together—intervening elements may be provided between the "coupled" or "electrically coupled" elements. In contrast, if an element is referred to as being "directly connected" or "directly coupled" to another element, there are no intervening elements present. The term "electrically connected" refers to a low-ohmic electric connection between the elements electrically connected together.

Although the terms first, second, etc., may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

Example embodiments are described herein with reference to cross-sectional illustrations that are schematic illustrations of idealized or simplified embodiments (and intermediate structures). As such, variations from the shapes of the illustrations as a result, for example, of manufacturing techniques and/or tolerances, may be expected. Thus, the regions illustrated in the figures are schematic in nature and their shapes do not necessarily illustrate the actual shape of a region or proportions of a device and do not limit the scope.

It is to be understood that other embodiments may be used and structural or logical changes may be made without departing from the spirit and scope defined by the claims. The description of the embodiments is not limiting. In particular, elements of the embodiments described hereinafter may be combined with elements of different embodiments.

The present disclosure generally relates to advanced architectures of phase change memory (PCM) that is able to more effectively control the state of the memory cell and more accurately determine its state. In order to achieve higher density phase memory device, a salient consideration is to be able to store as many bits in a unit area. In this regard, PCM has the ability to achieve a number of distinct intermediary states, thereby having the ability to hold multiple bits in a single cell. Intermediate resistances between amorphous and crystalline can be formed by an incomplete phase transition within the material, or by the size and shape of the amorphous region within the phase change material. Known devices and manufacturing techniques do not provide a sufficiently effective way to realize multi-level programming in a phase change memory cell, as well as multi-level storage. Accordingly, what is provided by the teachings herein is a method and structure for forming a multi-level programable phase change memory device. The techniques described herein may be implemented in a number of ways. Example implementations are provided below with reference to the following figures.

Example Phase Change Memory

Figure 1B:
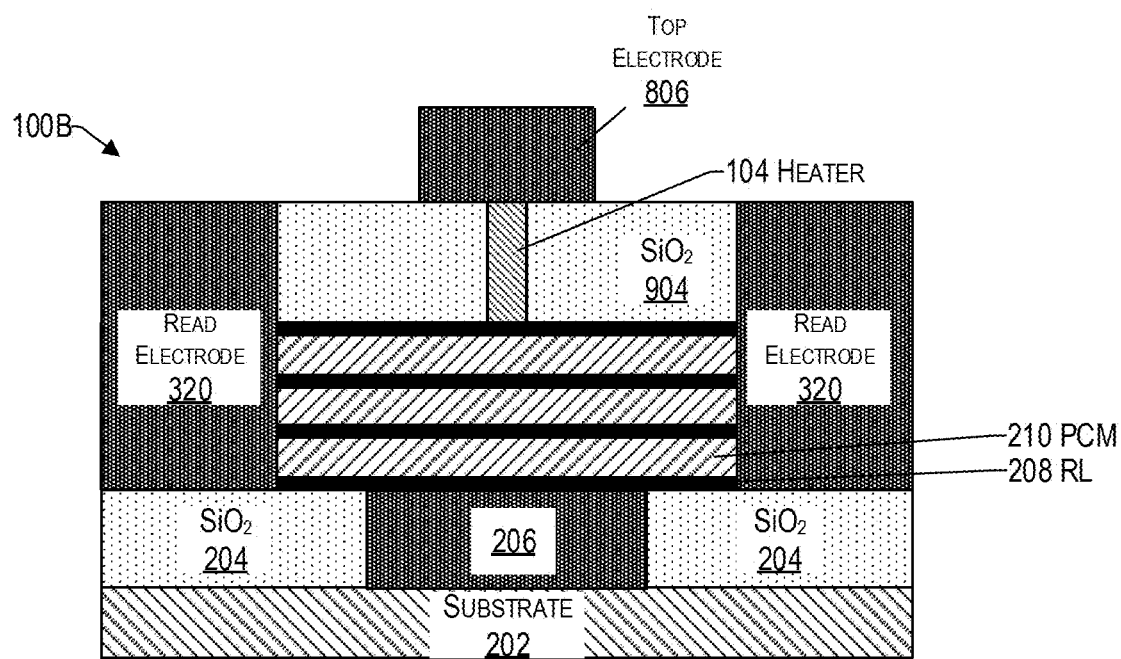

Reference now is made to FIGS. 1A and 1B, which provide front 100A and side 100B cross-section views of a phase change memory, respectively, which can store two or more bits, consistent with an illustrative embodiment. The PCM cell 100A/B has alternatively stacked PCM material 210 and a resistive liner (RL) 208 between the heater 104 and top electrode 806. The resistance of each RL 208 is substantially higher than the resistance of a PCM layer 210. Each PCM layer 210 will go through phase change from crystalline to amorphous in a subsequent order during programming, while the multiple resistance can be read by two read electrodes 320 connected to two lateral ends of the PCM cell segment. The more crystalline the PCM layer 210 is, the less resistance it exhibits. Each PCM layer can be viewed as a parallel resistance between the two read electrodes 320. By way of example only and not by way of limitation, three PCM layers 210, each separated by an RL 208 is illustrated in FIGS. 1A and 1B, while it will be understood that any appropriate number of stacks are within the scope of the present disclosure.

Figure 1C:
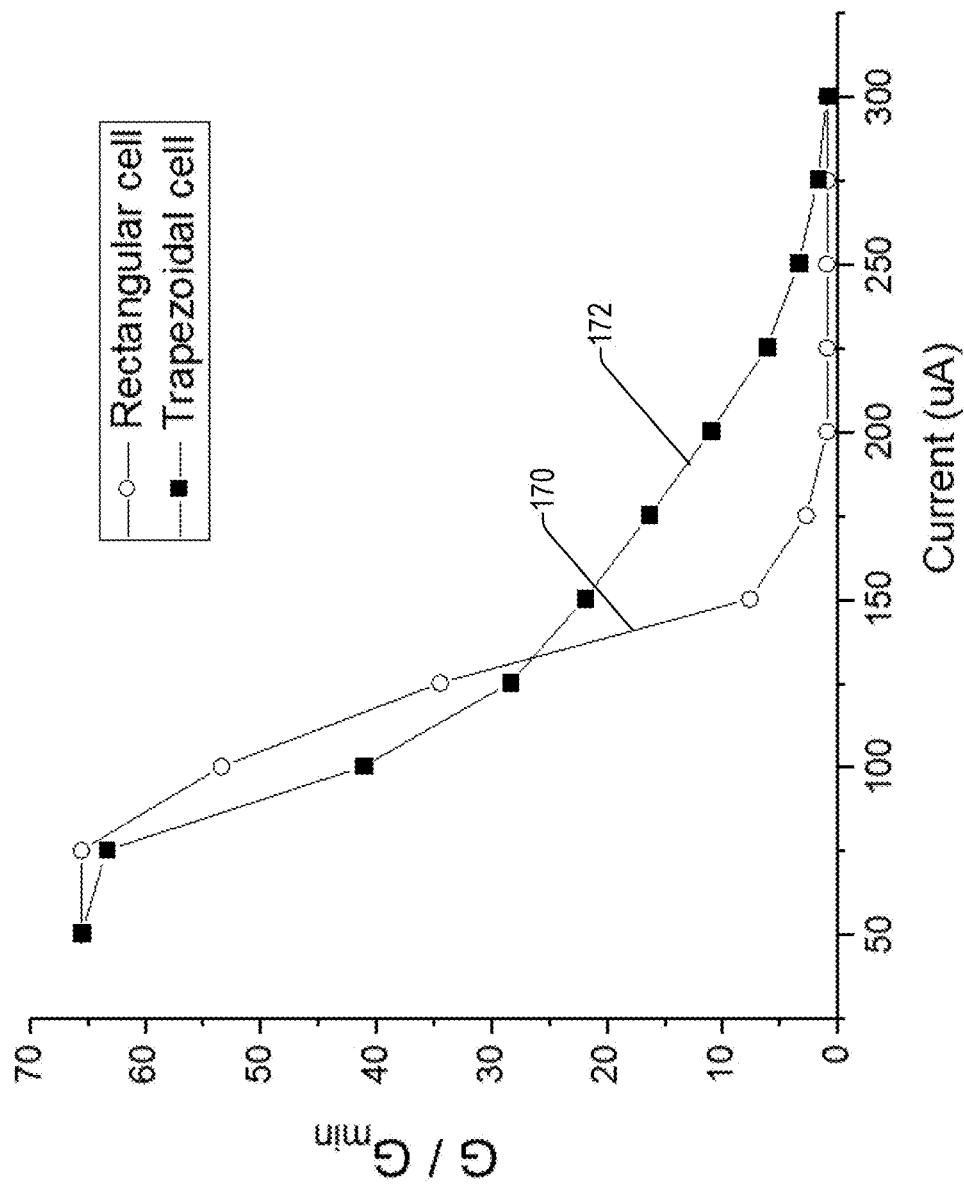
FIG. 1C provides example comparison between programming curves for a rectangular cell and a trapezoidal cell, consistent with an illustrative embodiment.

In one aspect, the PCM cell 100A can have a trapezoidal-prism-shaped segment, sometimes referred to herein as a phase change structure 250, having alternatively stacked PCM 210 and RL 208, wherein the lower and upper surface of the trapezoid-shaped segment is electrically connected to bottom electrode 206 and a top electrode 806, respectively. A heater 104 is present between the top electrode 806 and phase change structure 250. As the thermally hot spot occurs around the interface between heater and the phase change structure 250, the amorphization of phase change material through melting/quenching (often referred as to RESET operation of phase change memory) starts in the phase change material layer adjacent to the heater and propagates to other phase change material layers (e.g., downwards in FIGS. 1A and 1B). The trapezoidal shape provides better control of amorphization of each phase change material layer in the phase change structure 250. In other words, it ensures that, as the amorphization starts near the heater and propagates downwards, each phase change material layer can be fully amorphized with a lower RESET current when compared with a rectangular shape. Otherwise, a higher RESET current may be needed in order to (e.g., almost) completely shut off a segment and prevent any "sneaky current," sometimes referred to herein as parasitic leakage, around portions of the PCM 210 that were not sufficiently crystalized. In addition to the advantage of reduced RESET current, another advantage of the trapezoidal shape phase change structure 250, is illustrated in FIG. 1C, which provides example comparison between programming curves for a rectangular cell 170 and a trapezoidal cell 172, consistent with an illustrative embodiment. As illustrated in FIG. 1C, the trapezoidal cell 172 provides a much more linear response of conductance (i.e., inverse of resistance) than that of the rectangular cell 170.

Referring back to FIGS. 1A and 1B, the voltage and/or current between the programming electrodes, sometimes referred to herein as the write top 806 and bottom 206 electrodes, is able to change the phase of one or more PCM layers in a controlled way. For example, the current provided through the heater 104 can gradually amorphize the different PCM layers. Read electrodes can be provided at two lateral ends of the trapezoidal prism 320. Significantly, the read electrodes 320 on the left and right side of the of the structure 100B, are separate from the programming electrodes 806 and 206. For example, a small voltage applied between the read electrodes 320 can determine a cumulative resistance of stack segment of the alternately stack of PCM and RL. By virtue of the structure of the example structure depicted in FIGS. 1A and 1B a multi-level programmable PCM cell 100A/B is provided with a resistive liner 208 that is able to mitigate resistance drift.

Example Process for Phase Change Memory

With the foregoing description of the structure of an example phase change memory cell 100A/B, it may be helpful to discuss an example process of manufacturing the same. To that end, FIGS. 2 to 18 illustrate various steps in the manufacture of phase change memory cells, consistent with exemplary embodiments. In particular, FIG. 2A illustrates a semiconductor structure 200A that has undergone some semiconductor processing steps. The process begins with a substrate 202. In various embodiments, the substrate 202, may comprise any suitable material or combination of materials, such as doped or undoped silicon, glass, dielectrics, etc. For example, the substrate may comprise a semiconductor-on-insulator (SOI) structure, e.g., with a buried insulator layer, or a bulk material substrate, e.g., with appropriately doped regions, typically referred to as wells. In another embodiment, the substrate may be silicon with silicon oxide, nitride, or any other insulating films on top.

Other materials that may be used for the substrate include, without limitation, sapphire, aluminum oxide, germanium, gallium arsenide (GaAs) or any of the other III-V periodic table compounds, indium phosphide (InP), silicon carbide (SiC), an alloy of silicon and germanium, etc. The substrate 202 can act as a conductor or an insulator, depending on the materials and concentrations chosen. Thus, as used herein, the term substrate 202 refers to a foundation upon which the PCM can be built. In some embodiments, the foundation already has pre-built devices, such as transistor devices, isolation structures, contacts, etc.

A bottom electrode 206 is formed on top of the substrate 202 surrounded by an interlayer dielectric (ILD), such as silicon dioxide. In one embodiment, the bottom electrode may be used as a bit-line.

FIGS. 2B and 2C provide a cross-section view 200B and a top view 200C, respectively, of a semiconductor structure having a deposition of alternately stacked PCM layer 210 and RL 208, consistent with an illustrative embodiment. There are N PCM 210 layers and N+1 RL 208 layers. In the example of FIG. 2B, the number of PCM layers N is 3, while other numbers are supported as well. In one embodiment, the thickness of each PCM layer 210 and RL may be different. Stated differently, the thickness of one or more RL layers may be different, the thickness of one or more PCM layers may be different, or any combination thereof. In yet another embodiment, the RL layers may be omitted and a full PCM film can be used as a phase change material element. In various embodiments, the PCM layer may comprise, without limitation, a Ge—Sb—Te (germanium-antimony-tellurium or "GST") alloy, Si—Sb—Te (silicon-antimony-tellurium) alloys, Ga—Sb—Te (gallium-antimony-tellurium) alloys, Ge—Bi—Te (germanium-bismuth-tellurium) alloys, In—Se (indium-tellurium) alloys, As—Sb—Te (arsenic-antimony-tellurium) alloys, Ag—In—Sb—Te (silver-indium-antimony-tellurium) alloys, Ge—In—Sb—Te alloys, Ge—Sb alloys, Sb—Te alloys, Si—Sb alloys, and combinations thereof. In some embodiments, the phase change material can further include nitrogen, carbon, and/or oxygen. In some embodiments, the phase change material can be doped with dielectric materials including but not limited to aluminum oxide, silicon oxide, tantalum oxide, hafnium oxide, zirconium oxide, cerium oxide, silicon nitride, silicon oxynitride, germanium oxide, germanium nitride, germanium oxynitride, etc. An example method for forming phase change material uses physical vapor deposition (PVD)-sputtering or magnetron-sputtering method. Other deposition methods, such as atomic layer deposition (ALD), chemical vapor deposition (CVD), etc., are also contemplated. As to the RL layer, in various embodiments it may comprise, without limitation, aluminum nitride (AlN), boron nitride (BN), aluminum oxide (AlO), TaN, TiN, tungsten nitride (WN), cobalt tungsten (CoW), nickel tungsten (NiW), or yttrium oxide (YO), or any combination thereof. The resistance of resistive liner is substantially greater the resistance of the heater (e.g., five to fifty times higher, or about twenty times higher). Furthermore, the resistance of resistive liner is substantially greater than the resistance of phase change material in a low resistance state (e.g., ten to forty times higher, or about twenty times higher) and substantially lower than the resistance of phase change material in high resistance state (e.g., five to fifty times lower, or about ten times lower). The resistivity of resistive liner can be, for example, in the range of 0.1 ohm micrometers ($\Omega\mu m$) to 1 kiloohm micrometers ($k\Omega\mu m$). The resistive liner can be deposited by any suitable technique, including but not limited to ALD, PVD, CVD, etc. In one embodiment, the metal layer is tantalum nitride (TaN) and the PCM layer is GST (germanium-antimony-tellurium), for example, 10 nm GST/2 nm TaN liner. The stacked layers of the PCM 210 and RL 208 are patterned into strips.

FIGS. 3A and 3B provide a cross-section view 300A and a top view 300B, respectively, of a semiconductor structure having a formation of read electrodes 320 on the lateral left and right sides of the semiconductor structure, consistent with an illustrative embodiment. To that end, in some embodiments, etching mask layer(s) may be provided, and the layers that are not protected thereby are removed on the left and right side of the semiconductor structure to create the read electrodes 320. For example, as is understood by those of ordinary skill in the art, a mask layer (not shown), which can be a soft mask such as photoresist or a hardmask such as amorphous carbon, may be provided on the TiN layer 230. Lithography process can be performed, for example, exposing the photoresist material to a pattern of light, and developing the exposed photoresist material. An etching process, such as a reactive ion etch (ME), may be used to form patterns (e.g., openings) by removing portions of the TiN 230 and PCM 210 and RL 208 stack, up to the top surface of the $SiO_2$ 204. After etching, the mask layer may be removed using a conventional plasma ashing or stripping process. Accordingly, the pattern of the mask layer facilitates the removal of several layers of the TiN 230 as well as the PCM/RL stack layers, in areas where the mask layer has not been deposited, thereby leaving behind two read electrode regions, which are then filled with a conducting material. In various embodiments, the conducting material may comprise tungsten (W), aluminum (Al), copper (Cu), cobalt (Co), nickel (Ni), titanium (Ti), ruthenium (Ru), molybdenum (Mo), or any other suitable conductive material. Each electrode can further include a barrier layer. The barrier layer can be titanium nitride (TiN), tantalum nitride (TaN), hafnium nitride (HfN), niobium nitride (NbN), tungsten nitride (WN), tungsten carbon nitride (WCN), or combinations thereof. In various embodiments, the barrier layer can be deposited in the trench(es) by ALD, CVD, MOCVD, PECVD, or combinations thereof. In various embodiments, the conductive material can be formed by ALD, CVD, PVD, and/or plating.

Figure 4B:
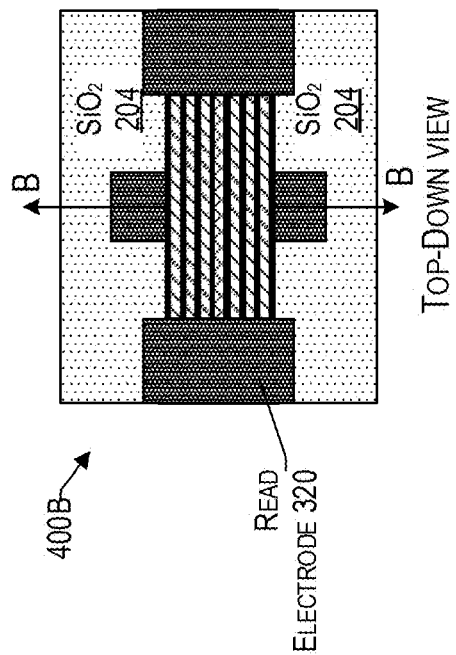
FIGS. 4A and 4B provide a cross-section view and a top view, respectively, of a semiconductor structure having a trapezoidal shape, consistent with an illustrative embodiment.
Figure 4A:
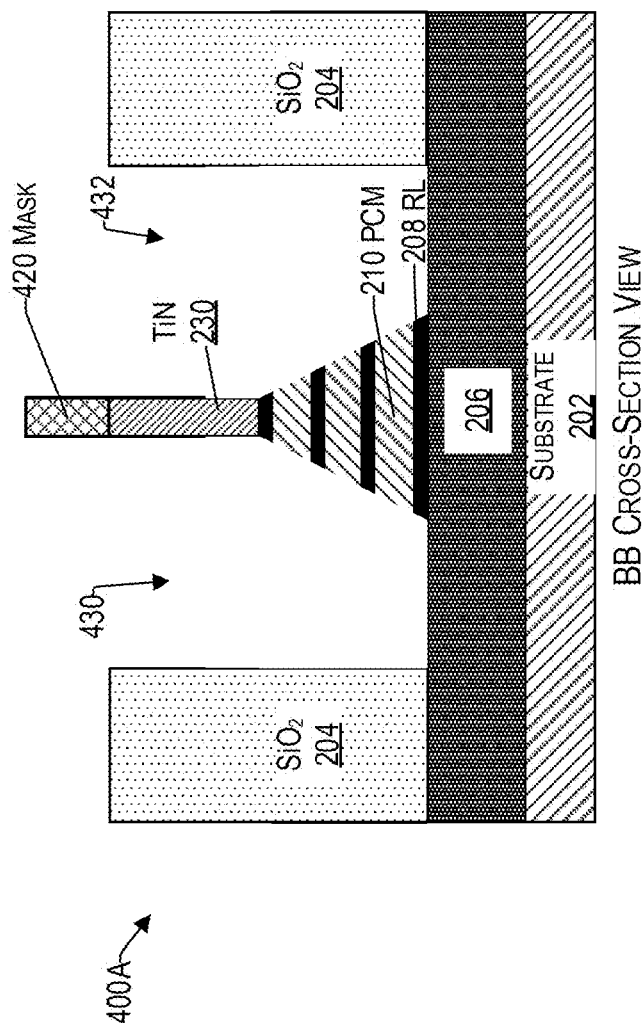
Figure 5B:
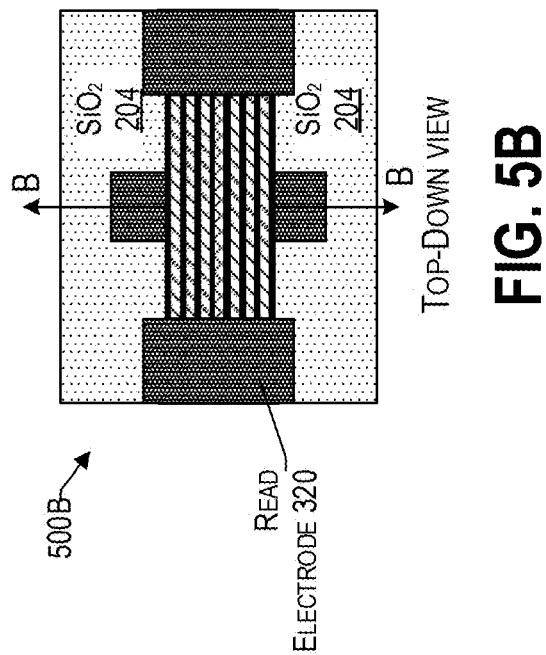
FIGS. 5A and 5B, provide a cross-section view and a top view, respectively, of a semiconductor structure where the bottom corners of the phase change structure are removed.
Figure 5A:
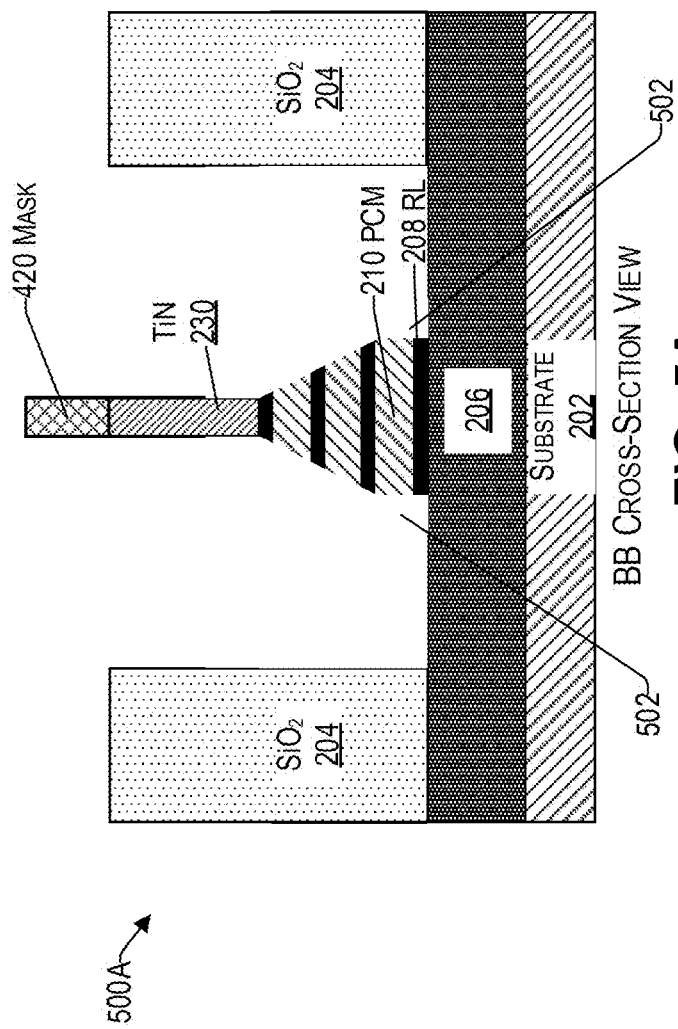

Reference now is made to FIGS. 4A and 4B, which provide a cross-section view 400A and a top view 400B, respectively, of a semiconductor structure having a trapezoidal shape, consistent with an illustrative embodiment. In one embodiment, a deep and tapered etch based on a cyclical passivation and etching is provided to create trenches 430 and 432, thereby creating a PCM pattern shape that is substantially trapezoidal like. In an alternative embodiment, as illustrated in FIGS. 5A and 5B, the bottom corners 502 of the RL/PCM 208/210 are removed. For example, the bottom corners 502 are removed after the cyclical etch and passivation of the trenches on the left and right side of the stacked PCM/RL structure, during a last etch step, without reduced passivation. By virtue of removing the final corners 502 parasitic current leakage paths are mitigated by being able to more completely amorphize the PCM. For example, a trapezoidal cell with the corner rounded (or squared) off has a reset current (e.g., <=250 uA, where uA stands for micron Ampere) that is smaller than that of a rectangular cell (e.g., >400 uA). Accordingly, the teachings herein may have any appropriate shape, including rectangular, trapezoidal, partial trapezoidal where the lower portion is not tapered as discussed hereinabove, etc.

Figure 6B:
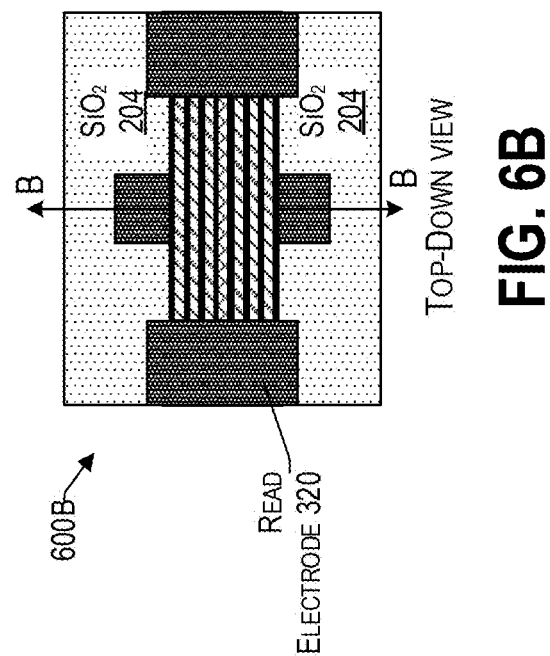
FIGS. 6A and 6B provide a cross-section view and a top view, respectively, of a semiconductor structure with respect to an encapsulation layer deposition in the trench regions of FIG. 4A, consistent with an illustrative embodiment.
Figure 6A:
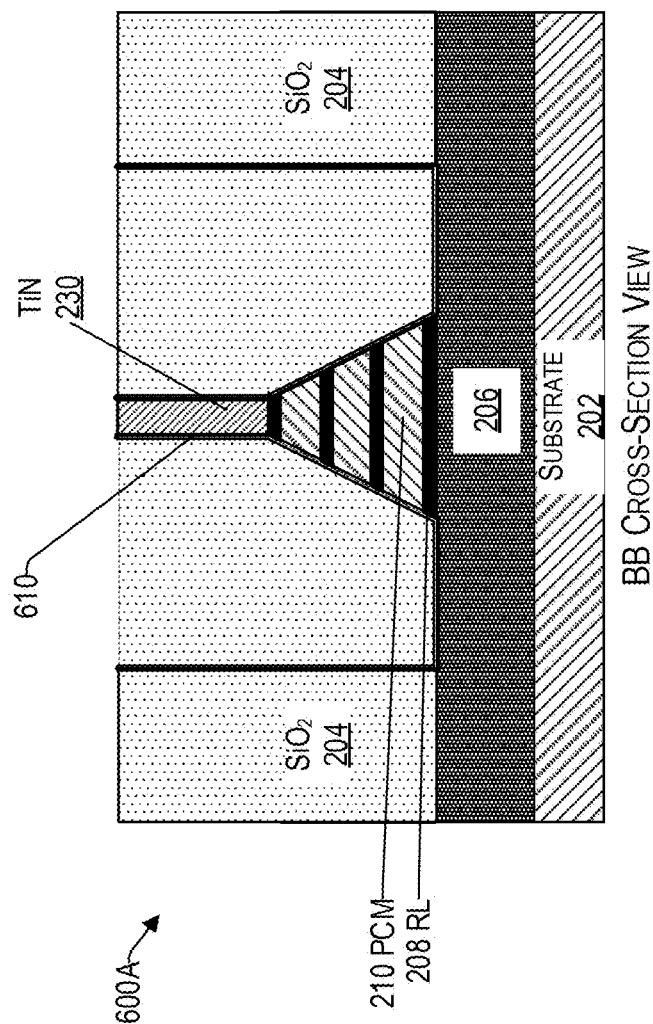

FIGS. 6A and 6B provide a cross-section view 600A and a top view 600B, respectively, of a semiconductor structure with respect to an encapsulation layer 610 deposition in the trench regions of FIG. 4A, consistent with an illustrative embodiment. More specifically, FIG. 6B illustrates a top view 600B immediately before the encapsulation layer 610 is deposited. In one embodiment, the encapsulation layer 610 is a dielectric, which may comprise silicon nitride SiN or silicon dioxide $SiO_2$. Thus, the open trench is backfilled with a dielectric. The backfill may comprise silicon nitride (SiN), silicon carbide (SiC), silicon oxynitride (SiON), carbon-doped silicon oxide (SiOC), fluorine-doped silicon oxide (SiO:F), silicon-carbon-nitride (SiCN), boron nitride (BN), silicon boron nitride (SiBN), silicoboron carbonitride (SiBCN), silicon oxycabonitride (SiOCN), silicon oxide, boron carbon nitride (BCN), hydrogen silsesquioxane polymer (HSQ), methyl silsesquioxane polymer (MSQ), methyl doped silica (SiO:(CH3)), organosilicate glass (SiCOH), porous SiCOH, and combinations thereof. Deposition methods: CVD, ALD, spin-on, etc. This dielectric is deposited and a chemical-mechanical planarization (CMP) is used for the planarization with a stop at a top surface of the TiN 230. In this regard, FIGS. 7A and 7B provide a cross-section view 700A and a top view 700B, respectively, of a semiconductor structure immediately after the deposition and planarization of the encapsulation layer 610, consistent with an illustrative embodiment.

FIGS. 8A and 8B provide a cross-section view 800A and a top view 800B, respectively, of a semiconductor structure with a top electrode 806, consistent with an illustrative embodiment. In one embodiment, the bottom and top electrodes are of the same material, such as tungsten (W).

FIGS. 9A and 9B provide another cross-section view 900A and a top view 900B, respectively, of a semiconductor structure with a top electrode 806, consistent with an illustrative embodiment. More specifically, FIG. 9A illustrates a phase change structure comprising a predetermined number of intermittent RL 208 and PCM 210 layers that are alternately stacked. While only three PCM layers 210 are illustrated, it will be understood that many (e.g., tens or hundreds) of such alternately stacked layers are within the scope of the present teachings. The top 806 and bottom electrodes 206 can be used for programming (e.g., controlling the amorphous or crystalline state) of the stacked layers. The left and right electrodes 320 can be used for reading the state of the stacked layers.

Figure 11:
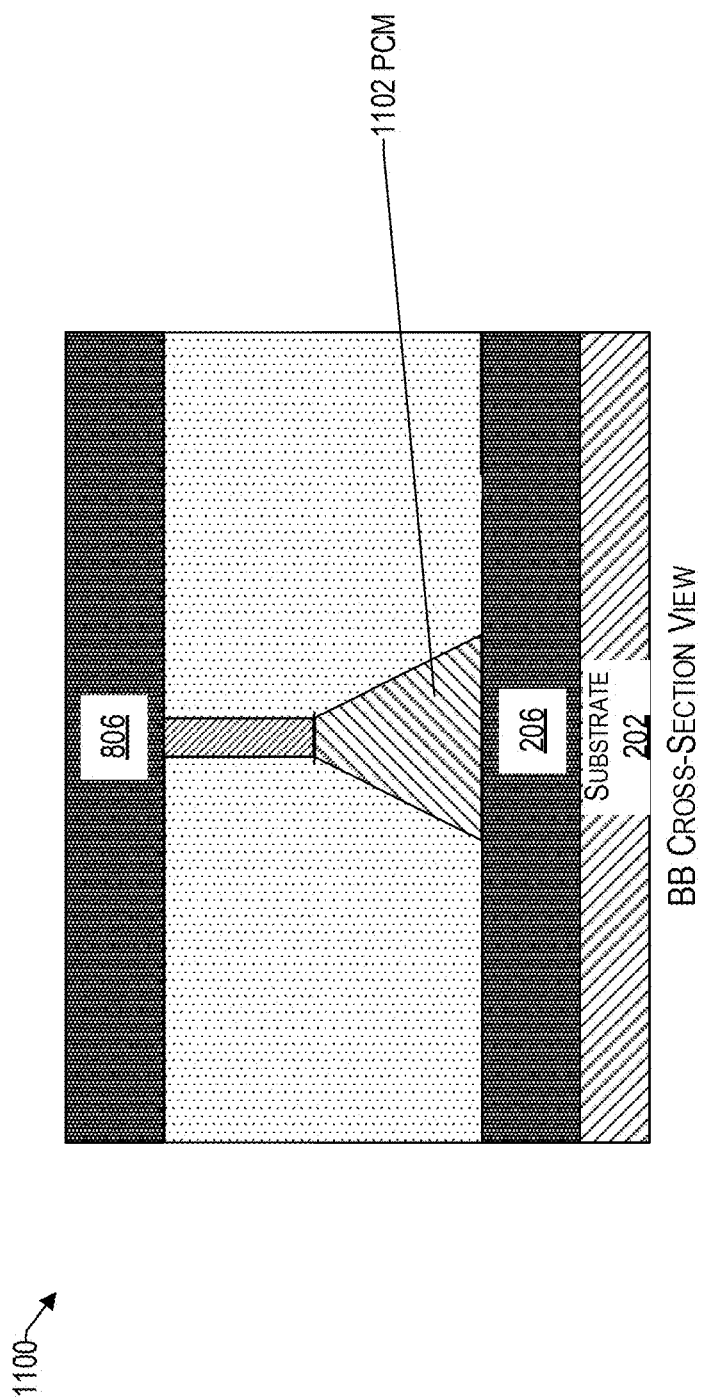
FIG. 11 is a cross-section view of a phase change memory cell where the RL layers are omitted and a full PCM film is used instead, consistent with an illustrative embodiment.

As mentioned previously, the thickness of the PCM layer and/or the RL can be different. In this regard, reference is made to FIGS. 10A and 10B, which illustrate cross section views of memory structures having a stacked structure where the RL and/or PCM may be different. Stated differently, the thickness of one or more RL layers may be different, the thickness of one or more PCM layers may be different, or any combination thereof. In yet another embodiment, the RL layers may be omitted and a full PCM film 1102 can be used as a phase change material element, as illustrated in FIG. 11.

Figure 12A:
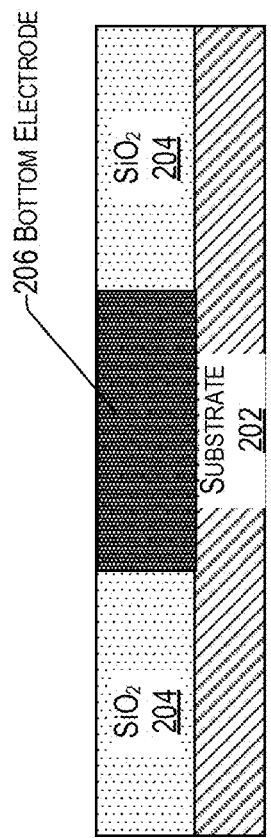
FIG. 12A illustrates a semiconductor structure that has undergone some semiconductor processing steps, consistent with an illustrative embodiment.
Figure 12B:
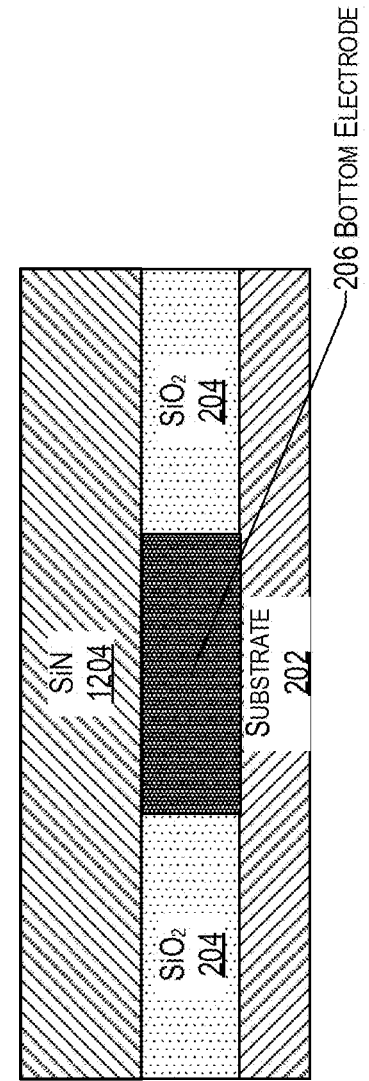
FIG. 12B is a cross-section view of a semiconductor structure where a first dielectric is deposited on top of the SiO2 and bottom electrode, consistent with an illustrative embodiment.

Reference now is made to FIGS. 12A to 18B, which illustrate various steps in the manufacture of another memory semiconductor memory structure, consistent with an embodiment. In particular, FIG. 12A illustrates a semiconductor structure 1200A that has undergone some semiconductor processing steps. The process begins with a substrate 202 having a bottom electrode. A similar structure was discussed previously and therefore not repeated here for brevity. A first dielectric is deposited on top of the SiO₂ and bottom electrode, as illustrated in FIG. 12B. In one embodiment, the first dielectric is silicon nitride (SiN).

Figure 13A:
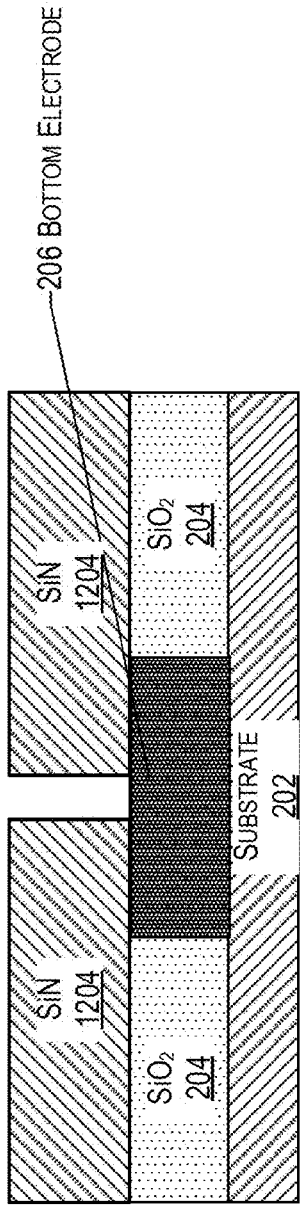
FIG. 13A provides a cross-section view of a semiconductor structure having an open via on the dielectric layer that extends to the top surface of the bottom electrode.
Figure 13B:
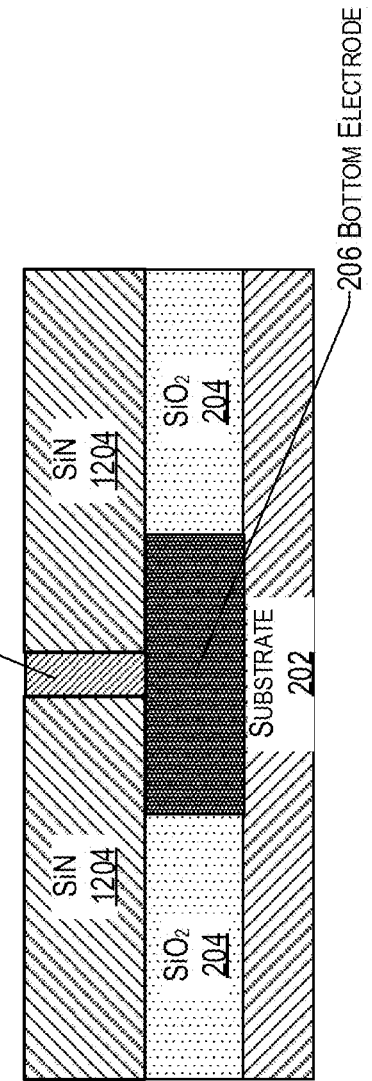
FIG. 13B provides a cross-section view of a semiconductor structure where a heater has been formed, consistent with an illustrative embodiment.

FIG. 13A provides a cross-section view 1300A of a semiconductor structure having an open via on the dielectric layer 11204 that extends to the top surface of the bottom electrode 206. Appropriate patterning and etching techniques can be used. The resulting via opening is then filled with a conducting material, as illustrated in semiconductor structure 1300B in FIG. 13B. In various embodiments, titanium nitride (TiN), tungsten (W), Tantalum nitride (TaN), titanium aluminide (TiAl), etc., or any combination thereof, can be used to form the heater 1308. While a single layer heater 1308 is shown, in various embodiments, the heater may comprise many layers and have a ring shape. The dielectric 1204 and heater 1308 layer can be planarized with a CMP process.

FIGS. 14A and 14B provide a cross-section view 1400A and a top view 1400B, respectively, of a semiconductor structure having a stacked structure 1402 coupled to the heater 1308, consistent with an illustrative embodiment. The stacked structure 1402 comprises alternatively stacked PCM material 1410 and a RL 208 between the heater 104. In one embodiment, the phase change material may comprise germanium-antimony-tellurium (GST). While only three PCM 1410 layers are illustrated, the stacked structure 1402 may comprise many more (e.g., tens or hundreds) of such alternating layers. In one embodiment, a TiN layer 1420 is placed on top of the stacked structure 1402, followed by a hardmask layer 1430, sometimes referred to as an etch mask. For example, 10 nm GST/2 nm TaN liner.

FIGS. 15A and 15B provide a different cross-section view 1500A and a top view 1500B of a semiconductor structure that illustrates an example shape of the stack of alternating RL and PCM layers, consistent with an illustrative embodiment. An upside-down trapezoidal shape (i.e., which tapers narrow towards the substrate 202 with respect to the substrate 202) is achieved by PCM patterning (e.g., cyclical passivation and etching). Accordingly, in contrast to the memory structure of FIG. 8A, the heater 1308 is coupled to the bottom electrode 206. In one embodiment, an encapsulation layer is provided on top of the dielectric layer (e.g., SiN) layer 1204, the sidewalls of the RL and PCM stack, TiN layer 140 and the exposed surface of the hardmask layer 1430, as illustrated in semiconductor structures 1600A of FIG. 16A. In one embodiment, the SiN layer 1610 is optional (i.e., not used), as illustrated in FIG. 16B.

FIGS. 17A and 17B provide a cross-section view 1700A and a top view 1700B of a semiconductor structure with a deposition of a dielectric 1708, consistent with an illustrative embodiment. In one embodiment, the dielectric is silicon oxide. CMP can be used to planarize the top surface of the dielectric 1708 with a stop on the top surface of the hardmask layer 1430, which also removes the encapsulation layer.

Reference now is made to FIGS. 18A and 18B, which show another cross-section view 1800A and a top view 1800B of a semiconductor structure, consistent with an illustrative embodiment. There is a top electrode 1420 coupled to a top of the stacked alternating RL and PCM structure. There is a hardmask 1430 on top of the top electrode 1420. Spacers 1804 are formed on each side of the hardmask 1430 and top electrode 1420.

There is a heater 1308 coupled between the bottom of the stacked alternating RL and PCM structure and a bottom electrode 206. The top and bottom electrodes 1420, 206 are used for programming the stacked structure. Significantly, the read electrodes 1820 are separate from the top 1420 and bottom 206 electrodes, and are at the lateral ends of the stacked structure.

Figure 19:
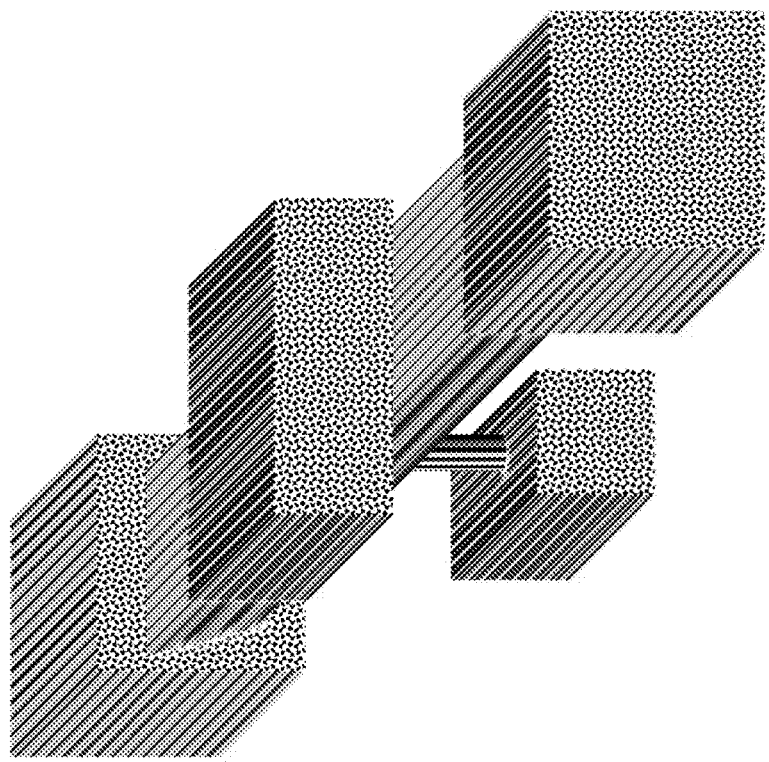
FIG. 19 provides a three-dimensional (3D) perspective view of a PCM structure, consistent with an illustrative embodiment.

FIG. 19 provides a three-dimensional (3D) perspective view of a PCM structure, consistent with an illustrative embodiment.

The method as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip may be mounted in a single chip package (such as a plastic carrier, with leads that are affixed to a motherboard or other higher-level carrier) or in a multichip package (such as a ceramic carrier that has either or both surface interconnections or buried interconnections). In any case, the chip can then be integrated with other chips, discrete circuit elements, and/or other signal processing devices as part of either (a) an intermediate product, such as a motherboard, or (b) an end product. The end product can be any product that includes integrated circuit chips, ranging from low-end applications, such as toys, to advanced computer products having a display, a keyboard or other input device, and a central processor.

CONCLUSION

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits, and advantages. These also include embodiments in which the components and/or steps are arranged and/or ordered differently.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A phase change memory cell, comprising:
   a phase change structure;
   a heater coupled to a first surface of the phase change structure;
   a first electrode coupled to a second surface of the phase change structure;
   a second electrode coupled to a second surface of the heater;
   a third electrode connected to a first lateral end of the phase change structure; and
   a fourth electrode connected to a second lateral end of the phase change structure,
   wherein the phase change structure comprises a stack of alternating layers of a resistive liner (RL) layer and a phase change memory (PCM) layer and a thickness of at least one PCM layer in the stack of alternating layers of the RL layer and the PCM layer is different from thicknesses of other PCM layers in the stack of alternating layers.

2. The phase change memory cell of claim 1, wherein a thickness of at least one RL layer in the stack of alternating layers of the RL layer and the PCM layer is different from thicknesses of other RL layers in the stack of alternating layers.

3. The phase change memory cell of claim 1, wherein the phase change structure comprises a uniform phase change material.

4. The phase change memory cell of claim 1, wherein the phase change structure has a trapezoidal-prism shape.

5. The phase change memory cell of claim 1, wherein the phase change structure has a first portion that is trapezoidal-prism shaped and a second abutting portion that is rounded or squared off.

6. The phase change memory cell of claim 1, wherein the first and second electrodes are configured to program the phase change structure.

7. The phase change memory cell of claim 1, wherein the third and fourth electrodes are configured to read a state of the phase change structure.

8. The phase change memory cell of claim 1, further comprising:
a substrate below the first electrode;
a first dielectric layer on top of the substrate and on a left and a right side of the first electrode; and
a second dielectric layer on top of the phase change structure and on a left and a right side of the heater.

9. The phase change memory cell of claim 8, wherein the phase change structure tapers wider towards the substrate.

10. The phase change memory cell of claim 1, further comprising:
a substrate below the second electrode;
a first dielectric layer on top of the substrate and on a left and a right side of the second electrode; and
a silicon nitride (SiN) layer on top of the first dielectric layer and the second electrode and on a left and a right side of the heater.

11. The phase change memory cell of claim 10, wherein the phase change structure tapers narrower towards the substrate.

12. The phase change memory cell of claim 1, wherein the heater has a ring shape.

13. The phase change memory cell of claim 1, wherein the heater comprises multiple layers.

14. A method of fabricating a phase change memory cell, comprising:
providing a bottom electrode;
creating a phase change structure above and coupled to the bottom electrode at a bottom surface of the phase change structure;
forming a left electrode and a right electrode on a left vertical side surface and a right vertical side surface of the phase change structure, respectively;
forming a heater on top of and coupled to a top surface of the phase change structure; and
providing a top electrode on top of and coupled to a top surface of the heater,
wherein the phase change structure comprises a stack of alternating layers of a resistive liner (RL) layer and a phase change memory (PCM) layer and a thickness of at least one PCM layer in the stack of alternating layers of the RL layer and the PCM layer is different from thicknesses of other PCM layers in the stack of alternating layers.

15. The method of claim 14, wherein the bottom electrode is on top of a substrate and the phase change structure has a trapezoidal-prism shape that tapers wider towards the substrate.

16. The method of claim 14, further comprising:
providing a first dielectric layer on top of a substrate and on a left and a right side of a first electrode; and
creating a second dielectric layer on top of the phase change structure and a left and a right side of the heater.

17. A phase change memory cell, comprising:
a phase change structure;
a heater coupled to a first surface of the phase change structure;
a first electrode coupled to a second surface of the phase change structure;
a second electrode coupled to a second surface of the heater;
a third electrode connected to a first lateral end of the phase change structure; and
a fourth electrode connected to a second lateral end of the phase change structure,
wherein the phase change structure comprises a stack of alternating layers of a resistive liner (RL) layer and a phase change memory (PCM) layer and a thickness of at least one RL layer in the stack of alternating layers of the RL layer and the PCM layer is different from thicknesses of other RL layers in the stack of alternating layers.

18. The phase change memory cell of claim 17, wherein a thickness of at least one PCM layer in the stack of alternating layers of the RL layer and the PCM layer is different from thicknesses of other PCM layers in the stack of alternating layers.

19. The phase change memory cell of claim 17, wherein the phase change structure comprises a uniform phase change material.

20. The phase change memory cell of claim 17, wherein the phase change structure has a trapezoidal-prism shape.

* * * * *